United States Patent
Kim et al.

(10) Patent No.: US 9,350,279 B2
(45) Date of Patent: May 24, 2016

(54) METHODS AND APPARATUSES FOR COMPENSATING FOR FRICTION TORQUES OF PERMANENT MAGNET SYNCHRONOUS MOTORS

(71) Applicant: Samsung Electronics Co., Ltd., Suwon-Si, Gyeonggi-Do (KR)

(72) Inventors: Hyun-bae Kim, Yongin-si (KR); Jung-hyo Lee, Suwon-si (KR); Jei-hoon Baek, Seoul (KR); Kyu-bum Han, Hwaseong-si (KR)

(73) Assignees: SAMSUNG ELECTRONICS CO., LTD., Gyeonggi-Do (KR); SUNGKYUNKWAN UNIVERSITY FOUNDATION FOR CORPORATE COLLABORATION, Gyeonggi-Do (KR)

( * ) Notice: Subject to any disclaimer, the term of this patent is extended or adjusted under 35 U.S.C. 154(b) by 136 days.

(21) Appl. No.: 14/309,135

(22) Filed: Jun. 19, 2014

(65) Prior Publication Data

US 2014/0375234 A1    Dec. 25, 2014

(30) Foreign Application Priority Data

Jun. 24, 2013    (KR) ........................ 10-2013-0072716

(51) Int. Cl.
*H02P 6/14* (2006.01)
*H02P 6/08* (2016.01)
*H02P 21/14* (2016.01)
*H02P 21/06* (2016.01)

(52) U.S. Cl.
CPC  *H02P 6/08* (2013.01); *H02P 21/06* (2013.01); *H02P 21/148* (2013.01)

(58) Field of Classification Search
USPC ................... 318/400.02, 700, 801
See application file for complete search history.

(56) References Cited

U.S. PATENT DOCUMENTS

| | | |
|---|---|---|
| 2006/0055363 A1 | 3/2006 | Patel et al. |
| 2007/0046246 A1 | 3/2007 | Borisavljevic |
| 2010/0231148 A1* | 9/2010 | Tobari ...................... H02P 6/08 318/400.02 |

FOREIGN PATENT DOCUMENTS

KR    20040032647 A    4/2004

* cited by examiner

*Primary Examiner* — Bentsu Ro
*Assistant Examiner* — Cortez Cook
(74) *Attorney, Agent, or Firm* — Harness, Dickey & Pierce, PLC (57) ABSTRACT

A method of compensating for a friction torque of a permanent magnet synchronous motor may include: receiving input of a motor current and a rotor speed of the permanent magnet synchronous motor; estimating a motor torque based on the input motor current; acquiring a first friction torque corresponding to the input rotor speed and the estimated motor torque by using a lookup table of friction torques; compensating for a second friction torque of the permanent magnet synchronous motor based on the first friction torque, wherein the compensating is in response to a first torque command input to control driving of the permanent magnet synchronous motor and outputs a second torque command that compensates for the second friction torque; and/or controlling the driving of the permanent magnet synchronous motor based on the second torque command.

15 Claims, 5 Drawing Sheets

METHODS AND APPARATUSES FOR COMPENSATING FOR FRICTION TORQUES OF PERMANENT MAGNET SYNCHRONOUS MOTORS

CROSS-REFERENCE TO RELATED APPLICATION(S)

This application claims priority from Korean Patent Application No. 10-2013-0072716, filed on Jun. 24, 2013, in the Korean Intellectual Property Office (KIPO), the entire contents of which are incorporated herein by reference.

BACKGROUND

1. Field

Some example embodiments may relate generally to methods and/or apparatuses for controlling torques in a permanent magnet synchronous motor.

2. Description of Related Art

Permanent magnet synchronous motors are used in various fields, such as electric automobiles, industrial devices, and electric home appliances, due to their high efficiency and strong durability. With the development of various control techniques, permanent magnet synchronous motors may be driven at high speed with high performance. During the driving of a permanent magnet synchronous motor, motor control may become unstable due to a change in motor speed, a change in ambient temperature, a variation in the direct current (DC) link voltage of an inverter, and a variation in motor parameters such as a voltage, a current, and a frequency. Therefore, there is a need for a permanent magnet synchronous motor control method that can stably transmit a torque to a load during the driving of a permanent magnet synchronous motor, even in the event of a change in motor speed, a change in ambient temperature, a variation in the DC link voltage of an inverter, and a variation in motor parameters.

SUMMARY

Some example embodiments may provide methods and/or apparatuses for compensating for friction torques of permanent magnet synchronous motors.

Some example embodiments may provide computer-readable recording mediums that store programs for executing the above methods in computers.

In some example embodiments, a method of compensating for a friction torque of a permanent magnet synchronous motor may comprise: receiving input of a motor current and a rotor speed of the permanent magnet synchronous motor; estimating a motor torque based on the input motor current; acquiring a first friction torque corresponding to the input rotor speed and the estimated motor torque by using a lookup table of friction torques; compensating for a second friction torque of the permanent magnet synchronous motor based on the first friction torque, wherein the compensating is in response to a first torque command input to control driving of the permanent magnet synchronous motor and outputs a second torque command that compensates for the second friction torque; and/or controlling the driving of the permanent magnet synchronous motor based on the second torque command.

In some example embodiments, the lookup table may be acquired by: acquiring a motor torque, generated in the permanent magnet synchronous motor at a maximum direct current (DC) link voltage of an inverter driving the permanent magnet synchronous motor, based on a dq-axis current corresponding to the rotor speed; detecting a torque transmitted to a load of the permanent magnet synchronous motor by using a torque sensor; calculating a friction torque by using a difference between the acquired motor torque and the detected torque; and/or acquiring the first friction torque based on the calculated friction torque, the acquired motor torque, and the rotor speed to which the dq-axis current corresponds.

In some example embodiments, the acquiring of the motor torque may comprise: detecting the dq-axis current corresponding to the rotor speed at the maximum DC link voltage of the inverter; acquiring a current map, representing variation in the dq-axis current corresponding to the rotor speed, based on the detected dq-axis current; and/or calculating the motor torque by using motor parameters and the variation in the dq-axis current of the current map.

In some example embodiments, the compensating for the second friction torque may comprise acquiring a third torque command by adding the first friction torque to the first torque command; calculating an error between the third torque command and the estimated motor torque; and/or acquiring the second torque command by compensating for the error between the third torque command and the estimated motor torque. The controlling of the driving of the permanent magnet synchronous motor may comprise controlling the driving of the permanent magnet synchronous motor by using the second torque command.

In some example embodiments, the acquiring of the second torque command may comprise compensating for the error by using a proportional integral controller.

In some example embodiments, the estimating of the motor torque may comprise: estimating motor parameters based on variation in the motor current; and/or calculating the motor torque based on the estimated motor parameters and the input motor current.

In some example embodiments, the motor parameters may comprise inductances of the permanent magnet synchronous motor and a magnetic flux linkage of a permanent magnet.

In some example embodiments, a non-transitory computer-readable recording medium that stores a program, which when executed by a computer, may perform a method of compensating for a friction torque of a permanent magnet synchronous motor.

In some example embodiments, a friction torque compensating apparatus for compensating for a friction torque of a permanent magnet synchronous motor may comprise: a torque estimator configured to estimate a motor torque based on an input motor current; a friction torque acquirer configured to receive an input of the estimated motor torque and a rotor speed of the permanent magnet synchronous motor and configured to acquire a first friction torque corresponding to the input rotor speed and the estimated motor torque by using a lookup table of friction torques; and/or a compensator configured to compensate for a second friction torque of the permanent magnet synchronous motor based on the first friction torque, wherein the compensating is in response to a first torque command input to control driving of the permanent magnet synchronous motor and results in a second torque command that compensates for the second friction torque. The friction torque compensating apparatus may be configured to output the second torque command to a control apparatus that controls the driving of the permanent magnet synchronous motor based on the second torque command.

In some example embodiments, the compensator may comprise a proportional integral controller. The compensator may be configured to acquire a third torque command by adding the first friction torque to the first torque command, may be configured to calculate an error between the acquired first torque command and the estimated motor torque, may be configured to acquire the second torque command by compensating for the error between the third torque command and the estimated motor torque by using the proportional integral controller, and/or may be configured to output the second torque command to the control apparatus to compensate for the second friction torque of the permanent magnet synchronous motor.

In some example embodiments, the torque estimator may comprise: a parameter estimator configured to estimate motor parameters based on variation in the motor current; and/or a torque calculator configured to calculate the motor torque based on the estimated motor parameters and the motor current.

In some example embodiments, the estimated motor parameters may comprise inductances of the permanent magnet synchronous motor and/or a magnetic flux linkage of a permanent magnet of the permanent magnet synchronous motor.

In some example embodiments, the lookup table may be acquired by using a detected dq-axis current, which is a dq-axis current corresponding to the rotor speed and is detected at a maximum direct current (DC) link voltage of an inverter driving the permanent magnet synchronous motor, and/or detected torque, which is a torque transmitted to a load of the permanent magnet synchronous motor and is detected by a torque sensor.

In some example embodiments, the friction torques of the lookup table may be calculated by a difference between the estimated motor torque and the detected torque. The motor torque may be acquired from the detected dq-axis current and estimated motor parameters. The lookup table may be acquired based on a correspondence relation between the calculated first friction torque, the motor torque, and the rotor speed to which the dq-axis current corresponds.

In some example embodiments, a control system for controlling driving of a permanent magnet synchronous motor may comprise: a friction torque compensating apparatus configured to receive input of a motor current and a rotor speed of the permanent magnet synchronous motor, configured to estimate a motor torque based on the input motor current, configured to acquire a first friction torque corresponding to the input rotor speed and the estimated motor torque by using a lookup table of friction torques, configured to compensate for a second friction torque of the permanent magnet synchronous motor based on the first friction torque, wherein the compensating is in response to a first torque command input to control driving of the permanent magnet synchronous motor, and configured to output a second torque command that compensates for the second friction torque; and/or a control apparatus configured to control the driving of the permanent magnet synchronous motor based on the second torque command and is output from the friction torque compensating apparatus. The control apparatus may comprise: a magnetic flux estimator configured to estimate a magnetic flux of the permanent magnet synchronous motor corresponding to the rotor speed and a maximum magnetic flux that is to be generated by the permanent magnet synchronous motor; a torque limiter configured to acquire a limited torque command by limiting a torque value of the second torque command according to a torque limit value; a current command acquirer configured to acquire a current command corresponding to the limited torque command and the rotor speed by using a lookup table of current commands; a current controller configured to generate a voltage command based on the acquired current command, the rotor speed, and a current detected by the permanent magnet synchronous motor; and/or a pulse width modulation (PWM) controller configured to determine an on-off duty ratio of a control pulse signal for controlling an output voltage of an inverter driving the permanent magnet synchronous motor, based on the voltage command. The control apparatus may be configured to output the control pulse signal to the inverter to control the driving of the permanent magnet synchronous motor.

BRIEF DESCRIPTION OF THE DRAWINGS

The above and/or other aspects and advantages will become more apparent and more readily appreciated from the following detailed description of example embodiments, taken in conjunction with the accompanying drawings, in which.

DETAILED DESCRIPTION

Example embodiments will now be described more fully with reference to the accompanying drawings. Embodiments, however, may be embodied in many different forms and should not be construed as being limited to the embodiments set forth herein. Rather, these example embodiments are provided so that this disclosure will be thorough and complete, and will fully convey the scope to those skilled in the art. In the drawings, the thicknesses of layers and regions may be exaggerated for clarity.

It will be understood that when an element is referred to as being "on," "connected to," "electrically connected to," or "coupled to" to another component, it may be directly on, connected to, electrically connected to, or coupled to the other component or intervening components may be present. In contrast, when a component is referred to as being "directly on," "directly connected to," "directly electrically connected to," or "directly coupled to" another component, there are no intervening components present. As used herein, the term "and/or" includes any and all combinations of one or more of the associated listed items.

It will be understood that although the terms first, second, third, etc., may be used herein to describe various elements, components, regions, layers, and/or sections, these elements, components, regions, layers, and/or sections should not be limited by these terms. These terms are only used to distinguish one element, component, region, layer, and/or section from another element, component, region, layer, and/or section. For example, a first element, component, region, layer, and/or section could be termed a second element, component, region, layer, and/or section without departing from the teachings of example embodiments.

Spatially relative terms, such as "beneath," "below," "lower," "above," "upper," and the like may be used herein for ease of description to describe the relationship of one component and/or feature to another component and/or feature, or other component(s) and/or feature(s), as illustrated in the drawings. It will be understood that the spatially relative terms are intended to encompass different orientations of the device in use or operation in addition to the orientation depicted in the figures.

The terminology used herein is for the purpose of describing particular example embodiments only and is not intended to be limiting of example embodiments. As used herein, the singular forms "a," "an," and "the" are intended to include the plural forms as well, unless the context clearly indicates otherwise. It will be further understood that the terms "comprises," "comprising," "includes," and/or "including," when used in this specification, specify the presence of stated features, integers, steps, operations, elements, and/or components, but do not preclude the presence or addition of one or more other features, integers, steps, operations, elements, components, and/or groups thereof.

Example embodiments may be described herein with reference to cross-sectional illustrations that are schematic illustrations of idealized example embodiments (and intermediate structures). As such, variations from the shapes of the illustrations as a result, for example, of manufacturing techniques and/or tolerances, are to be expected. Thus, example embodiments should not be construed as limited to the particular shapes of regions illustrated herein but are to include deviations in shapes that result, for example, from manufacturing. For example, an implanted region illustrated as a rectangle will typically have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature, their shapes are not intended to illustrate the actual shape of a region of a device, and their shapes are not intended to limit the scope of the example embodiments.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and should not be interpreted in an idealized or overly formal sense unless expressly so defined herein.

Reference will now be made to example embodiments, which are illustrated in the accompanying drawings, wherein like reference numerals may refer to like components throughout.

Figure 1:
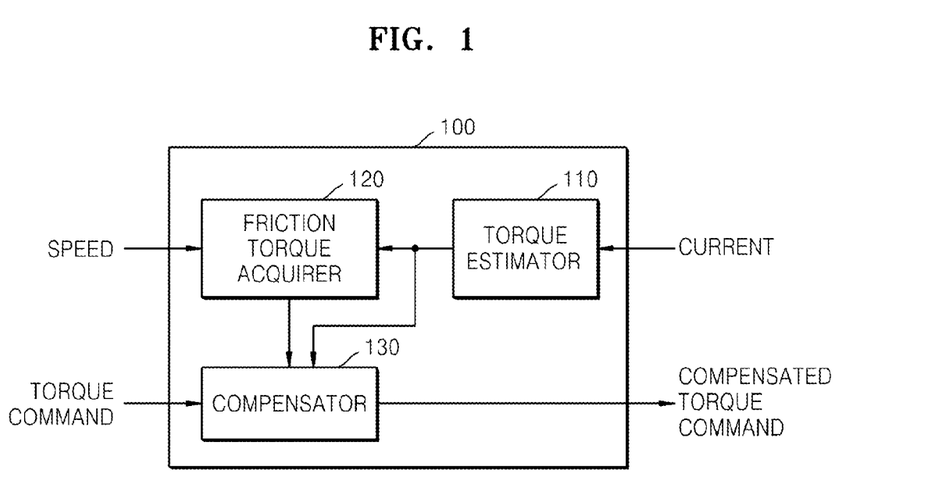
FIG. 1 is a block diagram illustrating a friction torque compensating apparatus according to some example embodiments.

FIG. 1 is a block diagram illustrating a friction torque compensating apparatus 100 according to some example embodiments. Referring to FIG. 1, the friction torque compensating apparatus 100 includes a torque estimator 110, a friction torque acquirer 120, and a compensator 130.

Those skilled in the art will understand that the friction torque compensating apparatus 100 may further include other general-purpose components in addition to the components illustrated in FIG. 1.

The friction torque compensating apparatus 100 according to some example embodiments may correspond to or include at least one processor. Accordingly, the friction torque compensating apparatus 100 may be included and operated in any other hardware apparatus such as a microprocessor or a general-purpose computer system.

The friction torque compensating apparatus 100 of FIG. 1 outputs a torque command, that compensates for a friction torque, to a control apparatus (not illustrated) that controls a torque of a permanent magnet synchronous motor (PMSM) (not illustrated).

The permanent magnet synchronous motor (not illustrated) is operated by generating a magnetic flux by using a permanent magnet located at a rotor of the permanent magnet synchronous motor, and flowing a current through a stator by using the generated magnetic flux. The permanent magnet synchronous motor according to some example embodiments may be an interior permanent magnet synchronous motor (IPMSM), but it is not limited thereto.

The control apparatus (not illustrated) receives the torque command with a friction torque compensated from the friction torque compensating apparatus 100, and outputs a control pulse signal to an inverter (not illustrated) driving the permanent magnet synchronous motor, according to the received torque command. The inverter supplies an inverter output voltage, which is generated according to the control pulse signal received from the control apparatus, to the permanent magnet synchronous motor.

The torque estimator 110 estimates a motor torque based on an input motor current. Herein, the motor current is a current detected in the permanent magnet synchronous motor. The motor torque is a torque generated in the permanent magnet synchronous motor. The motor torque is discriminated from a load torque that is transmitted from the permanent magnet synchronous motor to a load of the permanent magnet synchronous motor. For example, the torque estimator 110 may estimate the motor torque based on a variation in the motor current. The torque estimator 110 outputs the estimated motor torque to the friction torque acquirer 120.

The friction torque acquirer 120 receives an input of the estimated motor torque and the rotor speed of the permanent magnet synchronous motor, and acquires a friction torque corresponding to the rotor speed and the estimated motor torque by using a lookup table of friction torque.

Herein, the lookup table of friction torque is acquired by using a dq-axis current corresponding to the rotor speed detected at a maximum direct current (DC) link voltage of the inverter driving the permanent magnet synchronous motor, and a load torque detected by a torque sensor.

The lookup table of friction torque is acquired based on a correspondence relation between the friction torque, the motor torque, and the rotor speed corresponding to the dq-axis current. For example, the lookup table of friction torque may be calculated by a difference between the motor torque and the detected load torque, and the motor torque may be acquired from motor parameters and the detected dq-axis current.

The compensator 130 compensates for the friction torque of the permanent magnet synchronous motor, based on the friction torque acquired by the friction torque acquirer 120, in response to the torque command input to control the driving of the permanent magnet synchronous motor. The compensator 130 may compensate for the friction torque by using a proportional integral controller. This will be described in detail with reference to FIG. 2.

Accordingly, the friction torque compensating apparatus 100 outputs the input torque command to the control apparatus that controls the permanent magnet synchronous motor based on the torque command that compensates for a friction torque.

Figure 2:
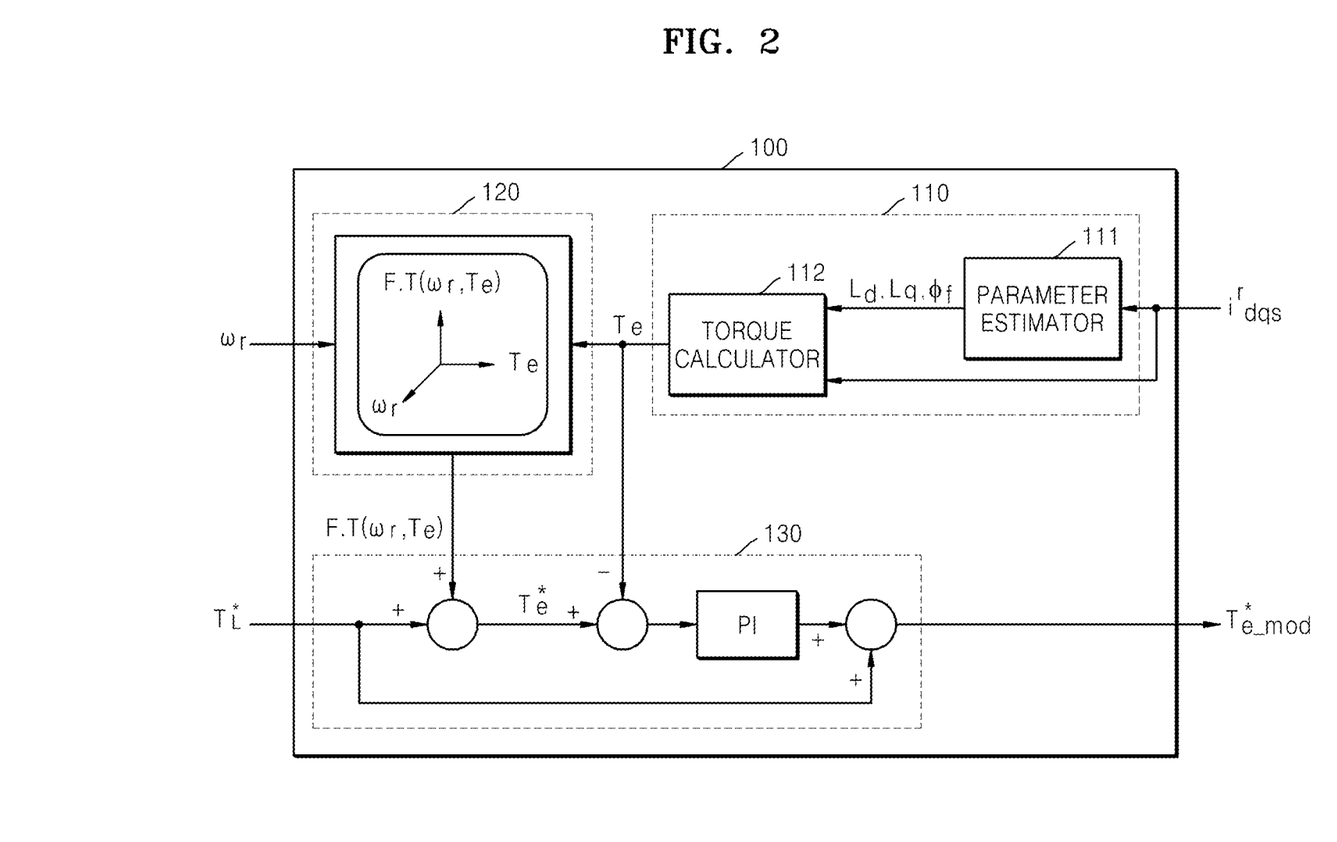
FIG. 2 is a diagram illustrating an example of the friction torque compensating apparatus illustrated in FIG. 1.

FIG. 2 is a diagram illustrating an example of the friction torque compensating apparatus 100 illustrated in FIG. 1.

Referring to FIG. 2, the friction torque compensating apparatus 100 includes a torque estimator 110, a friction torque acquirer 120, and a compensator 130. The torque estimator 110 of FIG. 2 includes a parameter estimator 111 and a torque calculator 112. The compensator 130 of FIG. 2 includes a proportional integral controller PI.

The friction torque compensating apparatus 100 of FIG. 2 may further include other general-purpose components in addition to the components illustrated in FIG. 2. Since the contents described in relation to the torque estimator 110, the friction torque acquirer 120, and the compensator 130 in FIG. 1 may also be applied to the torque estimator 110, the friction torque acquirer 120, and the compensator 130 in FIG. 2, a redundant description thereof will be omitted herein.

The torque estimator 110 estimates a motor torque $T_e$ based on an input motor current $i_{dqs}{}^r$. According to some example embodiments, the torque estimator 110 may include a parameter estimator 111 and a torque calculator 112.

The parameter estimator 111 estimates motor parameters based on the motor current $i_{dqs}{}^r$. Herein, the motor parameters may include inductances $L_d$, $L_q$ of the permanent magnet synchronous motor and a magnetic flux linkage $\phi_f$ of the permanent magnet.

The torque calculator 112 calculates the motor torque $T_e$ based on the estimated motor parameters and the motor current $i_{dqs}{}^r$. According to some example embodiments, the torque calculator 112 may calculate the motor torque $T_e$ according to Equation 1.

$$T_e = \frac{3P}{4}[\phi_f i_q + (L_d - L_q)i_d i_q] \quad \text{[Equation 1]}$$

In Equation 1, $T_e$ denotes the motor torque generated in the friction torque compensating apparatus 100, P denotes the number of poles of the rotor of the permanent magnet synchronous motor, $\phi_f$ denotes a magnetic flux linkage of the permanent magnet of the permanent magnet synchronous motor with respect to the motor current, $L_d$ denotes a d-axis inductance, $L_q$ denotes a q-axis inductance, $i_d$ denotes a d-axis motor current, and $i_q$ denotes a q-axis motor current.

The torque calculator 112 outputs the motor torque $T_e$, calculated by Equation 1, to the friction torque acquirer 120.

The friction torque acquirer 120 receives an input of the estimated motor torque $T_e$ and the rotor speed $\omega_r$ of the permanent magnet synchronous motor, and acquires a friction torque F.T corresponding to a rotor speed $\omega_r$ and the estimated motor torque $T_e$ by using the lookup table of friction torque.

The lookup table (LUT) is a data structure in which result values corresponding to input values are arranged or associatively arranged. The lookup table of friction torque stores friction torque values F.T corresponding to the rotor speed $\omega_r$ of the permanent magnet synchronous motor and the estimated motor torque $T_e$. The lookup table of friction torque may store friction torque values acquired by calculation or friction torque values acquired by experiments.

For example, the lookup table used in the friction torque acquirer 120 may be acquired based on the friction torque F.T, the motor torque $T_e$, and the rotor speed $\omega_r$ corresponding to the dq-axis current. Herein, the motor torque $T_e$ generated in the permanent magnet synchronous motor may be calculated by using motor parameters and a dq-axis current $i_{dqs}{}^r$ corresponding to the rotor speed $\omega_r$ at a maximum DC link voltage of the inverter. Alternatively, the motor torque $T_e$ may be calculated by using a current map representing a variation of the dq-axis current $i_{dqs}{}^r$ according to the rotor speed $\omega_r$. After the load torque transmitted to the load of the permanent magnet synchronous motor is detected by the torque sensor, the friction torque F.T may be acquired by using a difference between the motor torque and the detected load torque.

The compensator 130 compensates for the friction torque of the permanent magnet synchronous motor based on the acquired friction torque F.T in response to the torque command $T_L{}^*$ input to control the driving of the permanent magnet synchronous motor. The compensator 130 may further include a proportional integral controller PI. The proportional integral controller PI is a type of a feedback controller. The proportional integral controller PI calculates an error value by comparing a target value to be controlled with a reference value by using a proportional term and an integral term, and calculates a control value for control by using the calculated error value.

The compensator 130 acquires a first torque command $T_e{}^*$ by adding the friction torque F.T to the input torque command $T_L{}^*$. The compensator 130 compensates for an error between the first torque command $T_e{}^*$ and the estimated motor torque $T_e$ corresponding to a torque that is currently generated in the permanent magnet synchronous motor. First, the compensator 130 calculates an error between the first torque command $T_e{}^*$ and the estimated motor torque $T_e$, and outputs a control value for compensating for the error between the first torque command $T_e{}^*$ and the estimated motor torque $T_e$ by using the proportional integral controller PI.

The compensator 130 acquires a second torque command $T_{e\_mod}{}^*$ based on the input torque command $T_L{}^*$ and the control value output from the proportional integral controller PI, and outputs the second torque command $T_{e\_mod}{}^*$ to the control apparatus. The second torque command $T_{e\_mod}{}^*$ is a value that reflects the friction torque F.T of the current state and the estimated motor torque $T_e$ that is currently generated.

Accordingly, the friction torque compensating apparatus 100 compensates for a torque loss caused by the friction torque F.T changing a variation in the DC link voltage $V_{dc}$ and the rotor speed $\omega_r$ of the permanent magnet synchronous motor, thereby making it possible to reduce an error between the torque generated in the permanent magnet synchronous motor and the torque transmitted to the load.

Figure 3:
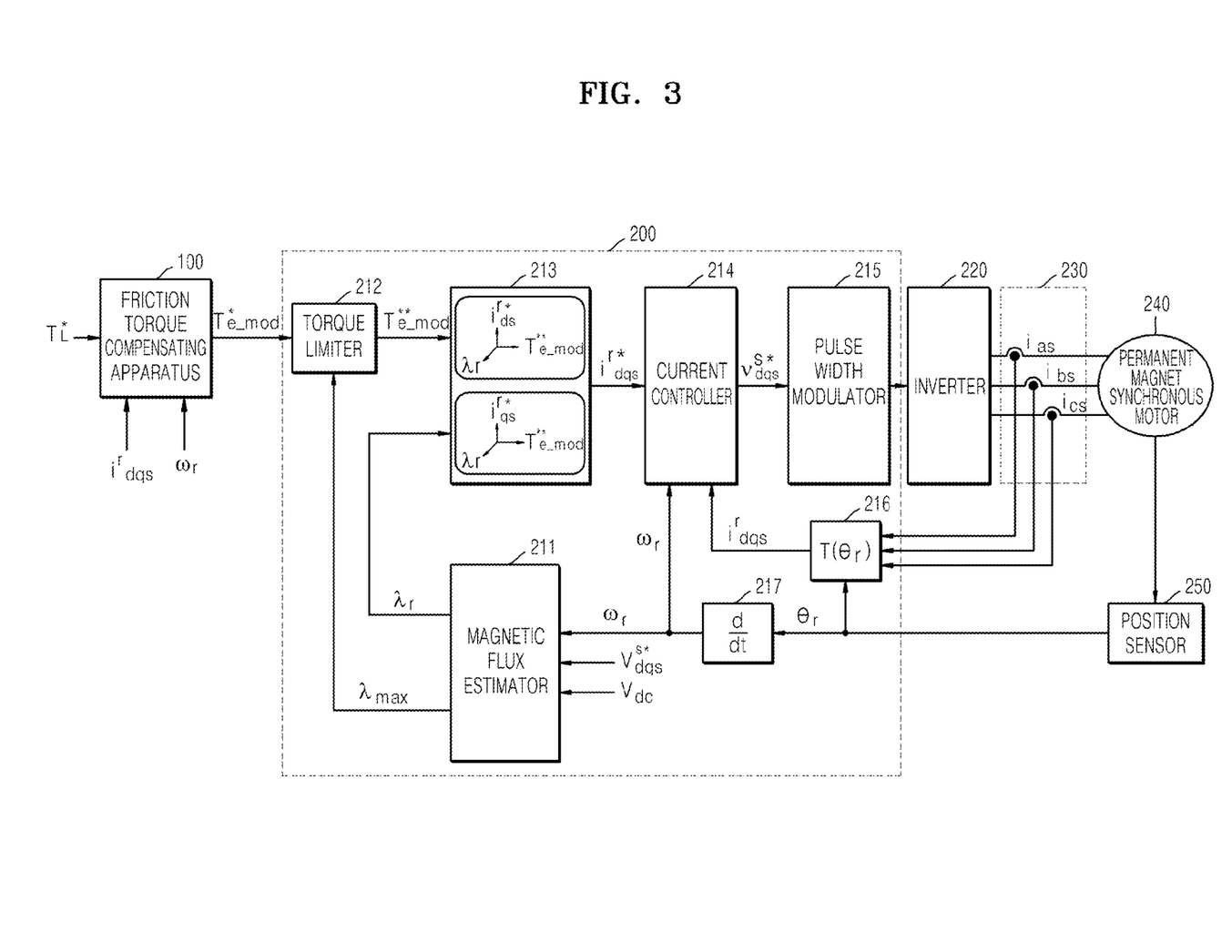
FIG. 3 is a block diagram illustrating a control system including a friction torque compensating apparatus according to some example embodiments.

FIG. 3 is a block diagram illustrating a control system including a friction torque compensating apparatus according to some example embodiments.

The control system includes a friction torque compensating apparatus 100, a control apparatus 200, an inverter 220, a current detector 230, a permanent magnet synchronous motor 240, and a position sensor 250. The control apparatus 200 includes a magnetic flux estimator 211, a torque limiter 212, a current command acquirer 213, a current controller 214, a pulse width modulator 215, a coordinate transformer 216, and a speed calculator 217.

Those skilled in the art will understand that the control system may further include other general-purpose components in addition to the components illustrated in FIG. 3.

Since the contents described in relation to the friction torque compensating apparatus 100 in FIGS. 1 and 2 may also be applied to the friction torque compensating apparatus 100 in FIG. 3, a redundant description thereof will be omitted herein.

The friction torque compensating apparatus 100 receives an input of the motor current $i_{dqs}{}^r$ and the rotor speed $\omega_r$ of the permanent magnet synchronous motor, and estimates the motor torque $T_e$ based on the input motor current $i_{dqs}{}^r$. The friction torque compensating apparatus 100 acquires the friction torque F.T corresponding to the input rotor speed $\omega_r$ and the motor torque $T_e$ estimated by using the lookup table of friction torque. The friction torque compensating apparatus 100 compensates for the friction torque of the permanent magnet synchronous motor based on the acquired friction torque F.T in response to the torque command $T_L^*$ input to control the driving of the permanent magnet synchronous motor, and outputs the compensated torque command $T_{e\_mod}^*$ (the motor torque with a friction torque compensated) to the control apparatus 200.

The control apparatus 200 receives the compensated torque command $T_{e\_mod}^*$ output from the friction torque compensating apparatus 100, and outputs a control pulse signal to the inverter driving the permanent magnet synchronous motor 240, based on the received torque command $T_{e\_mod}^*$.

The control apparatus 200 outputs the control pulse signal to the inverter 220 to control the driving of the permanent magnet synchronous motor 240. The control of the driving of the permanent magnet synchronous motor 240 may be performed through a vector control technique. Accordingly, three-phase parameters (represented in a, b, and c phases) of the permanent magnet synchronous motor 240 may be transformed into a dq-axis model (rectangular coordinate system) and displayed.

The control apparatus 200 according to some example embodiments may include a magnetic flux estimator 211, a torque limiter 212, a current command acquirer 213, a current controller 214, a pulse width modulator 215, a coordinate transformer 216, and a speed calculator 217.

The magnetic flux estimator 211 estimates a magnetic flux $\lambda r$ of the permanent magnet synchronous motor corresponding to the rotor speed $\omega_r$ and a maximum magnetic flux $\lambda_{max}$ that may be generated in the permanent magnet synchronous motor, based on the rotor speed $\omega_r$, the DC link voltage $V_{dc}$, and the output $v_{dqs}^{s*}$ of the current controller 214.

The torque limiter 212 limits a torque value of the compensated torque command $T_{e\_mod}^*$ based on the maximum magnetic flux $\lambda_{max}$, and acquires the torque command $T_{e\_mod}^{}$ having a limited torque value. The torque limiter 212 outputs the limited torque command $T_{e\_mod}^{}$ with a limited torque value of the compensated torque command to the current command acquirer 213.

The current command acquirer 213 receives the limited torque command $T_{e\_mod}^{}$ from the torque limiter 212**, and acquires a current command $i_{dqs}^{r*}$ based on the rotor speed $\omega_r$ and the limited torque command $T_{e\_mod}^{**}$ by using a lookup table of a current command.

The lookup table of a current command stores dq-axis current command values $i_{dqs}^r$ corresponding to the torque value $T_{e\_mod}^{**}$ of the limited torque command and the magnetic flux $\lambda r$ of the rotor of the permanent magnet synchronous motor. Herein, the lookup table of a current command acquires a d-axis current command value $i_{ds}^{r*}$ and a q-axis current command value $i_{qs}^{r*}$ according to the torque value of the limited torque command $T_{e\_mod}^{**}$ and the magnetic flux $\lambda r$ of the rotor of the permanent magnet synchronous motor.

Accordingly, with reference to the lookup table of a current command, the current command acquirer 213 outputs the current command $i_{dsq}^{r*}$ corresponding to the torque value $T_{e\_mod}^{}$ of the limited torque command, which has a torque value that is limited according the maximum magnetic flux $\lambda_{max}$ and the magnetic flux $\lambda r$ of the motor of the permanent magnet synchronous motor input to the current command acquirer 213, to the current controller 214**.

The current controller 214 controls the flow of current such that a desired current flows through the permanent magnet synchronous motor 240, and compensates for an error between the current command $i_{dqs}^{r*}$ and the current $i_{dqs}^r$ detected in the permanent magnet synchronous motor 240. According to some example embodiments, the current controller 214 may generate a voltage command $v_{dqs}^{s*}$ based on the rotor speed $\omega_r$, the current $i_{dqs}^{r*}$ detected in the permanent magnet synchronous motor 240, and the current command $i_{dqs}^{r*}$ received from the current command acquirer 213. The current controller 214 outputs the generated voltage command $v_{dqs}^{s*}$ to the pulse width modulator 215.

The pulse width modulator 215 determines an on/off duty ratio of the control pulse signal for controlling the output voltage of the inverter 220 driving the permanent magnet synchronous motor 240, based on the voltage command. The pulse width modulator 215 generates a control pulse signal for controlling a switching device of the inverter 220 based on the determined on/off duty ratio. The pulse width modulator 215 outputs the generated control pulse signal to the inverter 220. Accordingly, the inverter 220 may generate an output voltage according to the voltage command $v_{dqs}^{s*}$ based on the received control pulse signal.

The coordinate transformer 216 coordinate-transforms the three-phase current $i_{as}$, $i_{bs}$, $i_{cs}$ detected in the current detector 230, displays the same in a dq-axis model, and outputs a rotary coordinate system current $i_{dqs}^r$ that is coordinate-transformed into a dq-axis model.

The speed calculator 217 estimates the rotor speed $\omega_r$ based on the input rotor position $\theta_r$.

The inverter 220 converts an input voltage according to the on/off duty ratio of the control pulse signal received from the control apparatus 200, and generates an output voltage applied to the permanent magnet synchronous motor 240. Herein, the inverter 220 may be a voltage source inverter or a current source inverter. Hereinafter, for convenience of description, it is assumed that the inverter 220 is a voltage source inverter.

According to some example embodiments, the inverter 220 is a pulse width modulation (PWM) inverter, and may be driven by pulse width modulation. Accordingly, the amplitude and frequency of the output voltage output from the inverter 220 is controlled by using the on/off duty ratio of the control pulse signal. For example, the control apparatus 200 controls the output voltage output by the inverter 220, by controlling the on/off duty ratio of the control pulse signal for turning on/off the switching element of the inverter 220. Herein, the control pulse signal is also referred to as a gating signal. The control apparatus 200 may use a space vector PWM technique among pulse width modulation techniques according to voltage modulation techniques.

The output voltage of the inverter 220 is a three-phase voltage, and the permanent magnet synchronous motor 240 is driven by the three-phase voltage. The control of the driving of the permanent magnet synchronous motor 240 is performed through a vector control technique. Accordingly, three-phase parameters (represented in a, b, and c phases) of the permanent magnet synchronous motor 240 may be transformed into a dq-axis model (rectangular coordinate system) and displayed.

The current detector 230 detects the current of the permanent magnet synchronous motor 240 that is being driven, and output the detected current to the control apparatus 200. The current detector 230 detects the three-phase current $i_{as}$, $i_{bs}$, $i_{cs}$ of the permanent magnet synchronous motor 240 that is being driven. For example, the current detector 230 may be implemented by a shunt resistor or a current transformer. Since the current detected through the current detector 230 is a three-phase parameter, it is output to the coordinate transformer 216 of the control apparatus 200 in order to be coordinate-transformed into a dq-axis model (rectangular coordinate system).

The permanent magnet synchronous motor 240 generates a torque for driving the load, by generating a magnetic flux at the rotor by using the permanent magnet and flowing a current through the stator by using the generated magnetic flux. The permanent magnet synchronous motor 240 according to some example embodiments may be an interior permanent magnet synchronous motor (IPMSM), but it is not limited thereto. Hereinafter, for convenience of description, it is assumed that the permanent magnet synchronous motor 240 according to some example embodiments is an interior permanent magnet synchronous motor.

The permanent magnet synchronous motor 240 is driven according to the output voltage output from the inverter 220. That is, the driving of the permanent magnet synchronous motor 240 is controlled based on the current detected in the permanent magnet synchronous motor 240 that is being driven through the inverter 220, the speed and position of the rotor, and the torque command input to control the driving of the permanent magnet synchronous motor 240.

The position sensor 250 detects the rotor position $\theta_r$ of the permanent magnet synchronous motor 240. For example, the position sensor 250 may be an encoder, a resolver, or a Hall sensor, but it is not limited thereto. The position sensor 250 outputs the generated rotor position $\theta_r$ to the speed calculator 217.

FIG. 4A through 4D are graphs illustrating torque characteristics of the permanent magnet synchronous motor according to a variation in the rotor speed and the DC link voltage of the inverter. In the graphs (a), (b), (c), and (d) of FIGS. 4A through 4D, a horizontal axis represent the rotor speed of the permanent magnet synchronous motor, and a vertical axis represents the torque.

Figure 4A:
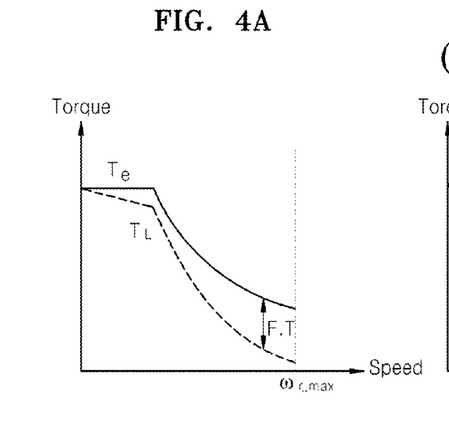
FIG. 4A through 4D are graphs illustrating torque characteristics of a permanent magnet synchronous motor according to a variation in the rotor speed and the direct current (DC) link voltage of an inverter.

The graph (a) represents the characteristics of a torque generated in the permanent magnet synchronous motor and a torque transmitted to the load, according to a variation in the rotor speed of the permanent magnet synchronous motor. In the graph (a), $T_e$ denotes a change in the torque generated in the permanent magnet synchronous motor according to a variation in the rotor speed, and $T_L$ denotes a change in the torque transmitted to the load according to a variation in the rotor speed.

In the graph (a), the torque $T_L$ transmitted to the load differs from the torque $T_e$ that is generated in the permanent magnet synchronous motor by the friction torque F.T. As the rotor speed $\omega_r$ increases, the friction torque F.T increases and an error between the torque $T_e$ generated in the permanent magnet synchronous motor and the torque $T_L$ transmitted to the load increases accordingly.

Figure 4B:
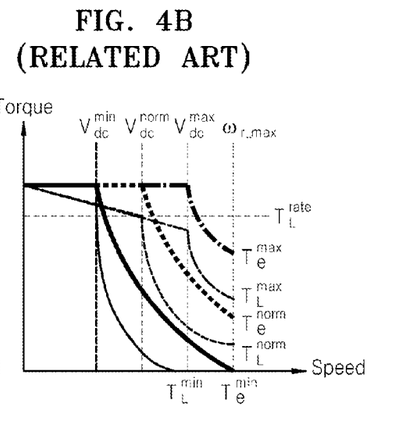

The graph (b) represents the characteristics of a torque generated in the permanent magnet synchronous motor and a torque transmitted to the load, according to a variation in the rotor speed of the permanent magnet synchronous motor and the DC link voltage of the inverter, in the case where only the magnetic flux estimator 211 is used according to the related art without compensation of a friction torque. In the graph (b), $T_e^{max}$, $T_e^{norm}$, $T_e^{min}$ denote a change in the torque generated in the permanent magnet synchronous motor according to a variation in the rotor speed when the levels of the DC link voltage of the inverter are respectively $V_{dc}^{max}$, $V_{dc}^{norm}$, $V_{dc}^{min}$ and $T_L^{max}$, $T_L^{norm}$, $T_L^{min}$ denote a change in the torque transmitted to the load according to a variation in the rotor speed $\omega_r$ when the levels of the DC link voltage of the inverter are respectively $V_{dc}^{max}$, $V_{dc}^{norm}$, $V_{dc}^{min}$.

When only the magnetic flux estimator 211 is used, since the torque $T_e$ generated in the permanent magnet synchronous motor in a constant torque/constant power region according to the level of the DC link voltage $V_{dc}$ of the inverter is increased and reflected at a constant ratio as represented in the graph (b), the friction torque component F.T according to a change in the rotor speed $\omega_r$ is not considered. That is, since the influence of the friction torque F.T generated according to the level of the DC link voltage $V_{dc}$ of the inverter is not accurately reflected, it is not easy to constantly control the torque transmitted to the load of the permanent magnet synchronous motor.

Figure 4C:
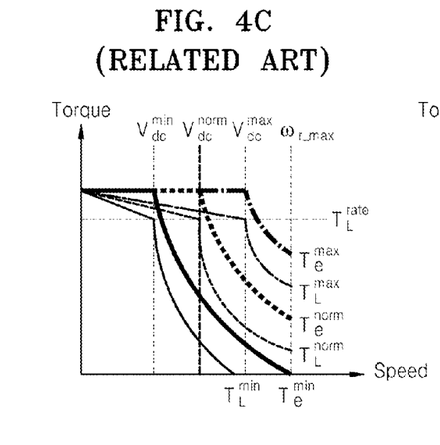

The graph (c) represents the characteristics of a torque generated in the permanent magnet synchronous motor and a torque transmitted to the load, according to a variation in the rotor speed of the permanent magnet synchronous motor and the DC link voltage of the inverter, in the case where the friction torque is reflected by using a magnetic flux-torque lookup table of a current command according to the related art.

In the graph (c), $T_e^{max}$, $T_e^{norm}$, $T_e^{min}$ denote a change in the torque generated in the permanent magnet synchronous motor according to a variation in the rotor speed when the levels of the DC link voltage of the inverter are respectively $V_{dc}^{max}$, $V_{dc}^{norm}$, $V_{dc}^{min}$ and $T_L^{max}$, $T_L^{norm}$, $T_L^{min}$ denote a change in the torque transmitted to the load according to a variation in the rotor speed $\omega_r$ when the levels of the DC link voltage of the inverter are respectively $V_{dc}^{max}$, $V_{dc}^{norm}$, $V_{dc}^{min}$.

The magnetic flux-torque lookup table of a current command according to the related art is generated according to the torque $T_e$ generated in the permanent magnet synchronous motor at the fixed DC link voltage $V_{dc}$, which does not accurately reflect a change in the friction torque F.T according to a variation in the rotor speed $\omega_r$ of the permanent magnet synchronous motor and the DC link voltage $V_{dc}$ of the inverter. Accordingly, in the graph (c), the torque $T_L$ transmitted to the load in a constant torque region maintains a constant torque value regardless of the rotor speed $\omega_r$.

Figure 4D:
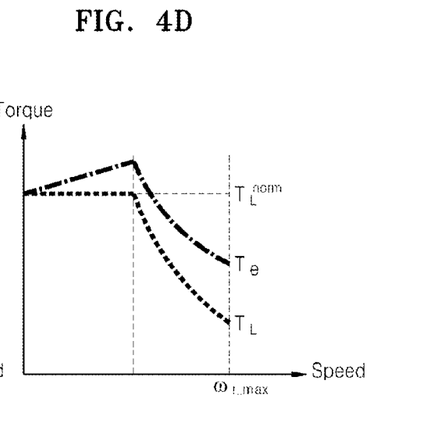

The graph (d) represents the characteristics of a torque generated in the permanent magnet synchronous motor and a torque transmitted to the load, according to a variation in the rotor speed of the permanent magnet synchronous motor, in the case where the friction torque compensating apparatus 100 according to some example embodiments is used. In the graph (d), $T_e$ denotes a change in the torque generated in the permanent magnet synchronous motor based on the compensated torque command with a friction torque compensated according to a variation in the rotor speed $\omega_r$ and the DC link voltage $V_{dc}$, and $T_L$ denotes a change in the torque transmitted to the load according to a variation in the rotor speed.

As represented in the graph (d), the friction torque compensating apparatus 100 outputs the torque command reflecting a change in the friction torque strength according to a variation in the DC link voltage and the rotor speed of the permanent magnet synchronous motor, thereby making it possible to control the torque such that the torque transmitted to the load of the permanent magnet synchronous motor maintains a constant torque value even in the event of a variation in the DC link voltage $V_{dc}$ and the rotor speed $\omega_r$.

Accordingly, the control apparatus according to some example embodiments may compensate for a torque loss caused by the friction torque even when the magnetic flux of the permanent magnet synchronous motor is controlled by using the magnetic flux-torque lookup table of a current command, thus making it possible to constantly control the torque transmitted to the load of the permanent magnet synchronous motor.

Figure 5:
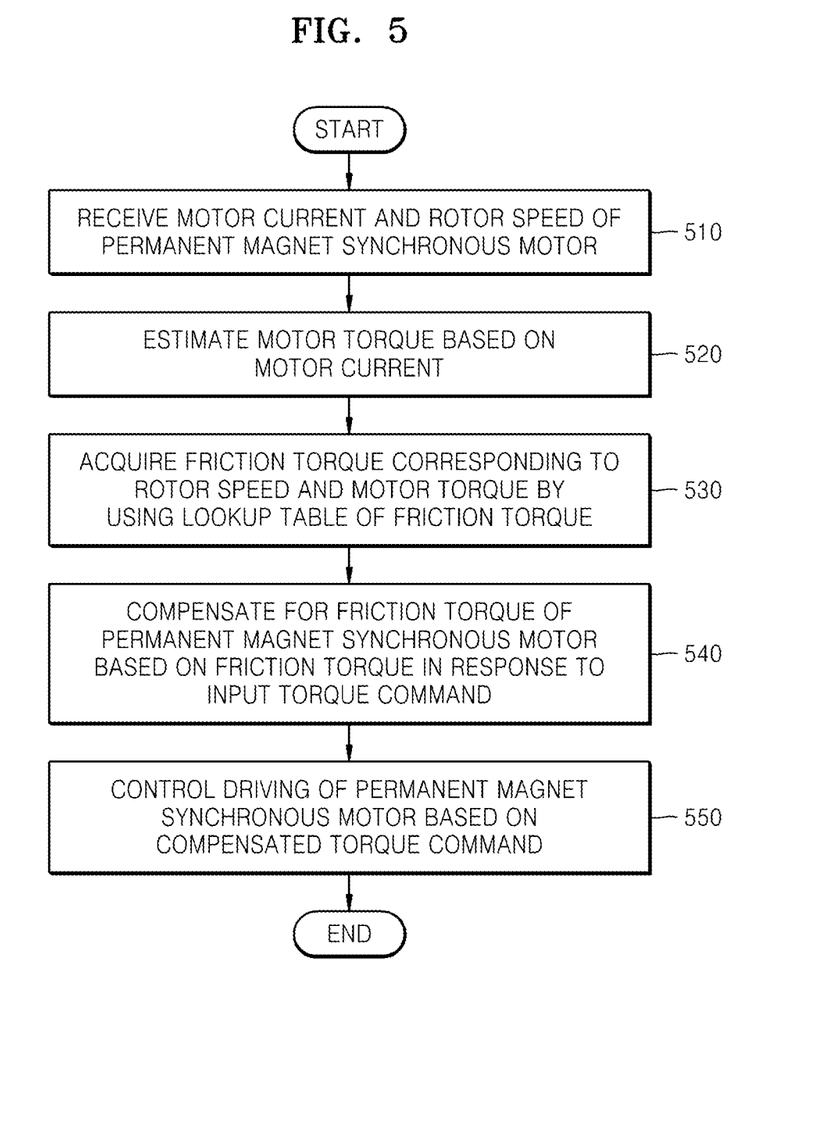
FIG. 5 is a flowchart illustrating a method of compensating for a friction torque of a permanent magnet synchronous motor by using a friction torque compensating apparatus according to some example embodiments.

FIG. 5 is a flowchart illustrating a method of compensating the friction torque of the permanent magnet synchronous motor by using the friction torque compensating apparatus according to some example embodiments. The method illustrated in FIG. 5 includes operations that are serially processed in the friction torque compensating apparatus 100 illustrated in FIGS. 1 through 3. Therefore, even when there are contents omitted in the following description, the contents described above in relation to the friction torque compensating apparatus 100 illustrated in FIGS. 1 through 3 may also be applied to the method illustrated in FIG. 5.

In operation 510, the friction torque compensating apparatus 100 receives an input of the motor current and the rotor speed of the permanent magnet synchronous motor. Herein, the motor current is a current detected in the permanent magnet synchronous motor.

In operation 520, the torque estimator 110 estimates a motor torque based on the input motor current. The motor torque is a torque generated in the permanent magnet synchronous motor. The motor torque is discriminated from a load torque that is transmitted from the permanent magnet synchronous motor to the load of the permanent magnet synchronous motor.

In operation 530, the friction torque acquirer 120 acquires the friction torque corresponding to the input rotor speed and the motor torque by using the lookup table of friction torque. Herein, the rotor speed corresponding to the dq-axis current and the friction torque values corresponding to the motor torque are stored in the lookup table of friction torque. For example, the lookup table of friction torque may be acquired by using the dq-axis current corresponding to the rotor speed detected at the maximum DC link voltage of the inverter driving the permanent magnet synchronous motor, and the load torque detected by the torque sensor.

In operation 540, the compensator 130 compensates for the friction torque of the permanent magnet synchronous motor based on the acquired friction torque in response to the input torque command. According to some example embodiments, the compensator 130 may compensate the friction torque by using a proportional integral controller PI.

In operation 550, the control apparatus 200 controls the driving of the permanent magnet synchronous motor based on the compensated torque command (torque command with a friction torque compensated) output from the friction torque compensating apparatus 100.

As described above, according to some example embodiments, the frictional torque of the permanent magnet synchronous motor is compensated for and the compensated torque command is provided to the control apparatus of the permanent magnet synchronous motor, thereby making it possible to stably control the torque transmitted to the load, without being affected by a variation in the rotor speed and the DC link voltage of the permanent magnet synchronous motor.

The above methods according to some example embodiments may be written as computer programs and may be implemented in general-use digital computers that execute the programs by using computer readable-recording mediums. Also, the data structures used in the above methods may be recorded in computer-readable recording mediums through various means. Examples of the computer-readable recording mediums may include recording mediums such as magnetic storage mediums (e.g., read-only memory (ROM), floppy disks, hard disks, etc.), and optical recording mediums (e.g., compact disc (CD)-ROMs, digital video discs (DVDs), etc.).

It will be understood by those skilled in the art that various changes in form and details may be made in some example embodiments without departing from the spirit and scope of the invention as defined by the appended claims. Thus, the example embodiments should be considered in descriptive sense only and not for purposes of limitation. Therefore, the scope of the invention is defined not by the detailed description of the invention but by the appended claims, and all differences within the scope will be construed as being included.

In addition, some example embodiments may also be implemented through computer readable code/instructions in/on a medium, e.g., a computer readable medium, to control at least one processing element to implement any above described embodiment. The medium may correspond to any medium/media permitting the storage and/or transmission of the computer readable code.

The computer readable code may be recorded/transferred on a medium in a variety of ways, with examples of the medium including recording media, such as magnetic storage media (e.g., ROM, floppy disks, hard disks, etc.) and optical recording media (e.g., CD-ROMs, or DVDs), and transmission media such as Internet transmission media. Thus, the medium may be such a defined and measurable structure including or carrying a signal or information, such as a device carrying a bitstream according to some example embodiments. The media may also be a distributed network, so that the computer readable code is stored/transferred and executed in a distributed fashion. Furthermore, the processing element could include a processor or a computer processor, and processing elements may be distributed and/or included in a single device.

It should be understood that example embodiments described therein should be considered in a descriptive sense only and not for purposes of limitation. Descriptions of features or aspects within example embodiments should typically be considered as available for other similar features or aspects in other example embodiments.

What is claimed is:

1. A method of compensating for a friction torque of a permanent magnet synchronous motor, the method comprising:
receiving input of a motor current and a rotor speed of the permanent magnet synchronous motor;
estimating a motor torque based on the input motor current;
acquiring a first friction torque corresponding to the input rotor speed and the estimated motor torque by using a lookup table of friction torques;
compensating for a second friction torque of the permanent magnet synchronous motor based on the first friction torque, wherein the compensating is in response to a first torque command input to control driving of the permanent magnet synchronous motor and outputs a second torque command that compensates for the second friction torque; and
controlling the driving of the permanent magnet synchronous motor based on the second torque command.

2. The method of claim 1, wherein the lookup table is acquired by:
acquiring a motor torque, generated in the permanent magnet synchronous motor at a maximum direct current (DC) link voltage of an inverter driving the permanent magnet synchronous motor, based on a dq-axis current corresponding to the rotor speed;
detecting a torque transmitted to a load of the permanent magnet synchronous motor by using a torque sensor;
calculating a friction torque by using a difference between the acquired motor torque and the detected torque; and
acquiring the first friction torque based on the calculated friction torque, the acquired motor torque, and the rotor speed to which the dq-axis current corresponds.

3. The method of claim 2, wherein the acquiring of the motor torque comprises:
- detecting the dq-axis current corresponding to the rotor speed at the maximum DC link voltage of the inverter;
- acquiring a current map, representing variation in the dq-axis current corresponding to the rotor speed, based on the detected dq-axis current; and
- calculating the motor torque by using motor parameters and the variation in the dq-axis current of the current map.

4. The method of claim 1, wherein the compensating for the second friction torque comprises:
- acquiring a third torque command by adding the first friction torque to the first torque command;
- calculating an error between the third torque command and the estimated motor torque; and
- acquiring the second torque command by compensating for the error between the third torque command and the estimated motor torque;
- wherein the controlling of the driving of the permanent magnet synchronous motor comprises controlling the driving of the permanent magnet synchronous motor by using the second torque command.

5. The method of claim 4, wherein the acquiring of the second torque command comprises compensating for the error by using a proportional integral controller.

6. The method of claim 1, wherein the estimating of the motor torque comprises:
- estimating motor parameters based on variation in the motor current; and
- calculating the motor torque based on the estimated motor parameters and the input motor current.

7. The method of claim 6, wherein the motor parameters comprise inductances of the permanent magnet synchronous motor and a magnetic flux linkage of a permanent magnet.

8. A non-transitory computer-readable recording medium that stores a program, which when executed by a computer, performs the method of claim 1.

9. A friction torque compensating apparatus for compensating for a friction torque of a permanent magnet synchronous motor, the friction torque compensating apparatus comprising:
- a torque estimator configured to estimate a motor torque based on an input motor current;
- a friction torque acquirer configured to receive an input of the estimated motor torque and a rotor speed of the permanent magnet synchronous motor and configured to acquire a first friction torque corresponding to the input rotor speed and the estimated motor torque by using a lookup table of friction torques; and
- a compensator configured to compensate for a second friction torque of the permanent magnet synchronous motor based on the first friction torque, wherein the compensating is in response to a first torque command input to control driving of the permanent magnet synchronous motor and results in a second torque command that compensates for the second friction torque;
- wherein the friction torque compensating apparatus is configured to output the second torque command to a control apparatus that controls the driving of the permanent magnet synchronous motor based on the second torque command.

10. The friction torque compensating apparatus of claim 9, wherein the compensator comprises a proportional integral controller, and
- wherein the compensator is configured to acquire a third torque command by adding the first friction torque to the first torque command, is configured to calculate an error between the acquired first torque command and the estimated motor torque, is configured to acquire the second torque command by compensating for the error between the third torque command and the estimated motor torque by using the proportional integral controller, and is configured to output the second torque command to the control apparatus to compensate for the second friction torque of the permanent magnet synchronous motor.

11. The friction torque compensating apparatus of claim 9, wherein the torque estimator comprises:
- a parameter estimator configured to estimate motor parameters based on variation in the motor current; and
- a torque calculator configured to calculate the motor torque based on the estimated motor parameters and the motor current.

12. The friction torque compensating apparatus of claim 11, wherein the estimated motor parameters comprise inductances of the permanent magnet synchronous motor and a magnetic flux linkage of a permanent magnet of the permanent magnet synchronous motor.

13. The friction torque compensating apparatus of claim 9, wherein the lookup table is acquired by using a detected dq-axis current, which is a dq-axis current corresponding to the rotor speed and is detected at a maximum direct current (DC) link voltage of an inverter driving the permanent magnet synchronous motor, and detected torque, which is a torque transmitted to a load of the permanent magnet synchronous motor and is detected by a torque sensor.

14. The friction torque compensating apparatus of claim 13, wherein the friction torques of the lookup table are calculated by a difference between the estimated motor torque and the detected torque,
- wherein the motor torque is acquired from the detected dq-axis current and estimated motor parameters, and
- wherein the lookup table is acquired based on a correspondence relation between the calculated first friction torque, the motor torque, and the rotor speed to which the dq-axis current corresponds.

15. A control system for controlling driving of a permanent magnet synchronous motor, the control system comprising:
- a friction torque compensating apparatus configured to receive input of a motor current and a rotor speed of the permanent magnet synchronous motor, configured to estimate a motor torque based on the input motor current, configured to acquire a first friction torque corresponding to the input rotor speed and the estimated motor torque by using a lookup table of friction torques, configured to compensate for a second friction torque of the permanent magnet synchronous motor based on the first friction torque, wherein the compensating is in response to a first torque command input to control driving of the permanent magnet synchronous motor, and configured to output a second torque command that compensates for the second friction torque; and
- a control apparatus configured to control the driving of the permanent magnet synchronous motor based on the second torque command and is output from the friction torque compensating apparatus;
- the control apparatus comprising:
  - a magnetic flux estimator configured to estimate a magnetic flux of the permanent magnet synchronous motor corresponding to the rotor speed and a maximum magnetic flux that is to be generated by the permanent magnet synchronous motor;

a torque limiter configured to acquire a limited torque command by limiting a torque value of the second torque command according to a torque limit value;

a current command acquirer configured to acquire a current command corresponding to the limited torque command and the rotor speed by using a lookup table of current commands;

a current controller configured to generate a voltage command based on the acquired current command, the rotor speed, and a current detected by the permanent magnet synchronous motor; and a pulse width modulation (PWM) controller configured to determine an on-off duty ratio of a control pulse signal for controlling an output voltage of an inverter driving the permanent magnet synchronous motor, based on the voltage command;

wherein the control apparatus is configured to output the control pulse signal to the inverter to control the driving of the permanent magnet synchronous motor.

* * * * *